United States Patent [19]

Gierschewski et al.

[11] Patent Number: 4,996,012
[45] Date of Patent: Feb. 26, 1991

[54] PROCESS AND SYSTEM FOR MOLDING SOLES ON TO SHOE UPPERS

[75] Inventors: Fritz Gierschewski; Claus D. Koster, both of Bremen; Joachim Lühr, Schwarme, all of Fed. Rep. of Germany

[73] Assignee: Klöckner Ferromatik Desma GmbH, Malterdingen, Fed. Rep. of Germany

[21] Appl. No.: 347,005

[22] Filed: May 4, 1989

[30] Foreign Application Priority Data

May 4, 1988 [DE] Fed. Rep. of Germany ....... 3815013

[51] Int. Cl.⁵ .................... B29C 37/02; B29C 45/76; A43B 119/00
[52] U.S. Cl. .................................. 264/40.1; 12/1 R; 264/162; 264/244; 264/328.2; 264/344; 364/474.29; 425/119; 425/129.2; 425/163; 425/576; 425/404; 425/446
[58] Field of Search ................. 264/40.1, 40.2, 40.4, 264/40.7, 244, 162, 328.2; 425/135, 138, 140, 141, 162, 163, 145, 119, 129.2, 576, 404, 446; 12/1 A, 77, 146 L, 1 R, 145; 901/3, 10; 364/474.29

[56] References Cited

U.S. PATENT DOCUMENTS

| 2,688,459 | 9/1954 | Merrill et al. | 425/135 |
|---|---|---|---|
| 4,125,353 | 11/1978 | Stark | 425/119 |
| 4,134,278 | 1/1979 | Becka | 12/1 R |
| 4,153,402 | 5/1979 | Sanderson | 425/145 |
| 4,436,771 | 3/1984 | Simmonds, Jr. et al. | 12/145 |
| 4,525,315 | 6/1985 | Greter | 264/40.2 |
| 4,710,330 | 12/1987 | Lewandowski et al. | 264/40.7 |
| 4,720,253 | 1/1988 | Koentges | 264/40.7 |
| 4,801,256 | 1/1989 | Landwehr et al. | 425/119 |
| 4,817,222 | 4/1989 | Shafir | 12/146 L |
| 4,951,338 | 8/1990 | Brown et al. | 12/77 |

FOREIGN PATENT DOCUMENTS

| 2308062 | 8/1973 | Fed. Rep. of Germany | 12/146 L |
|---|---|---|---|
| 2417168 | 11/1974 | Fed. Rep. of Germany | 12/146 L |
| 1229070 | 5/1986 | U.S.S.R. | 425/135 |

OTHER PUBLICATIONS

Machines and Materials, *Automatic Roughening with Direct Soling*, Schuh-Technik & abc, Jul. 1987, p. 509.

*Primary Examiner*—Jeffery Thurlow
*Assistant Examiner*—Mathieu Vargot
*Attorney, Agent, or Firm*—Watson, Cole, Grindle & Watson

[57] ABSTRACT

To automate the roughening of the peripheral surface of a shoe upper in the region to be soled, the application of adhesive along such surface and a final deburring operation, prior to injection molding the last supported shoe upper in the region of lateral side mold elements is measured at the peripheral curvature to determine a curved line of spacial coordinates and angles of curvature starting at a preselected null point, and the values are stored. Another last supported shoe upper is moved by a rotary turntable to be scanned at selected points along its periphery for comparing the selected points to the spacial coordinates and angles of curvature. Any deviation therefrom is adapted to a second preselected null point, after which the shoe upper is guided by a computer controlled robotic device along the curved line starting from the second null point.

14 Claims, 1 Drawing Sheet

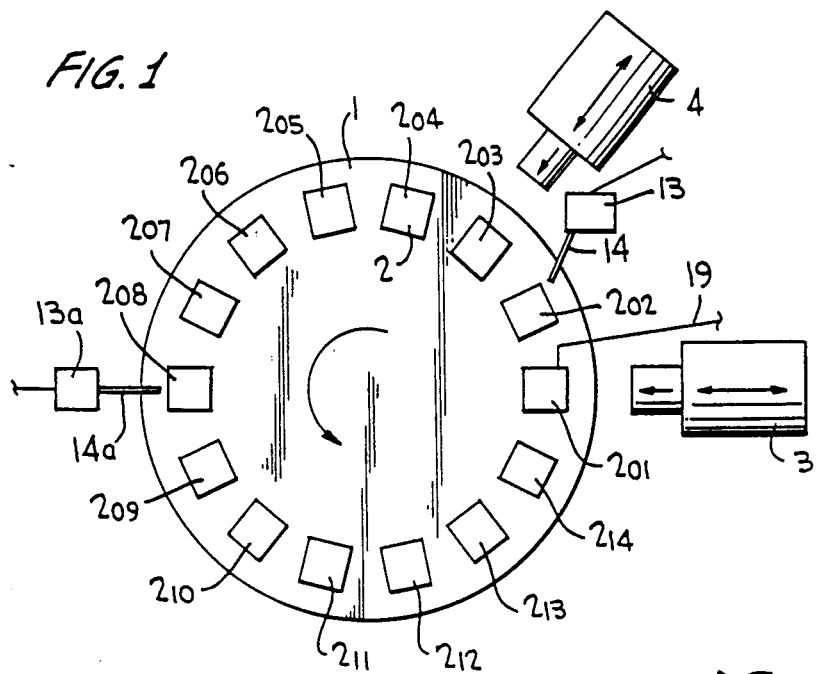
FIG. 1
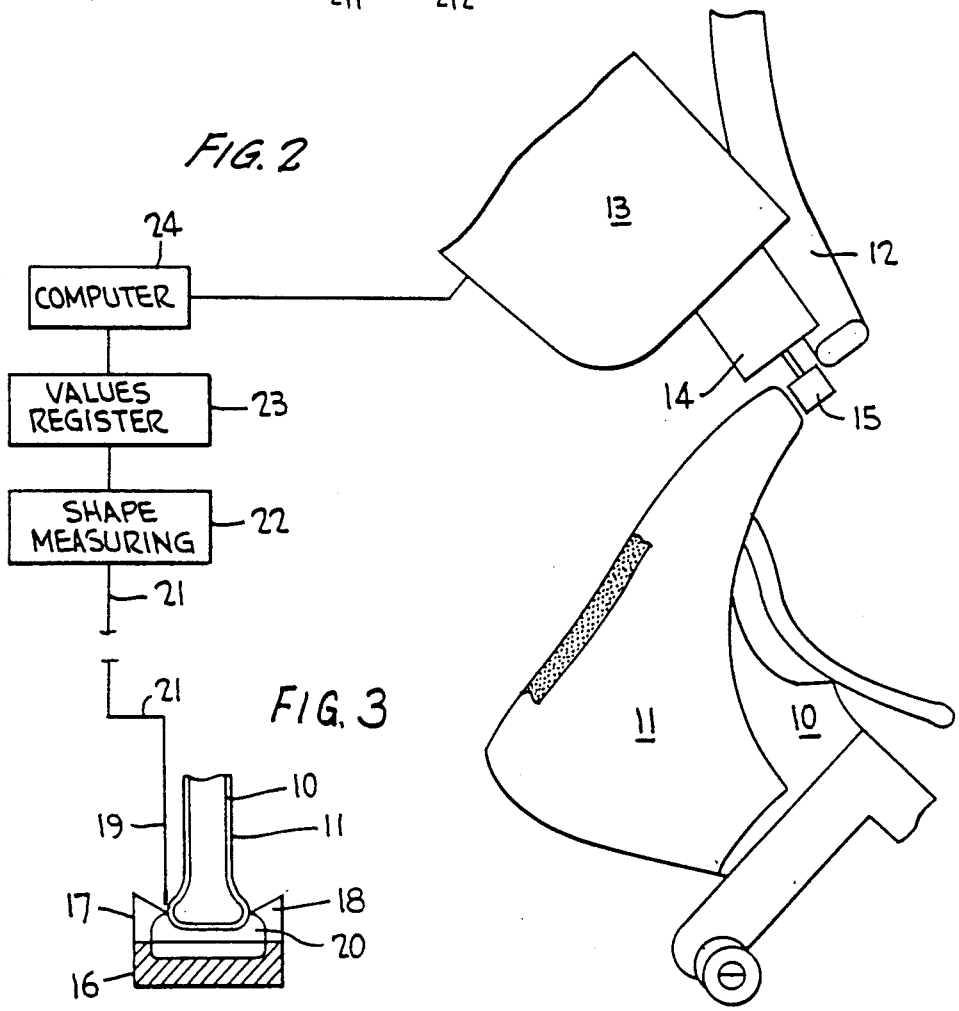
FIG. 2
FIG. 3

PROCESS AND SYSTEM FOR MOLDING SOLES ON TO SHOE UPPERS

BACKGROUND OF THE INVENTION

This invention relates to a process and system for molding soles on to last supported shoe uppers, wherein the spatial coordinates x, y, z of the molding-on region of the shoe upper periphery are measured, and a processing tool such as a roughening element for the shoe upper surface or an adhesive applicator or a deburring element is guided along a curved line determined by the spatial coordinates. A shoe molding apparatus is located at each of a plurality of equally spaced apart shoe molding stations on a circular turntable installation, each such apparatus comprising a last supported shoe upper, a movable bottom stamp and a mold cavity delimited by the bottom stamp and a pair of opposing lateral side mold elements closing against the periphery of the shoe upper. Upon incremental movement of the turntable, the cavity at each station is injected with low viscosity material such as polyurethane, thermoplastic material, rubber, for molding a sole on to the shoe upper. The peripheral edge of the shoe upper is thereafter freed of extrusion burrs.

During the process of molding soles on to last supported shoe uppers, adherence of the molded sole to the shoe upper can be improved if in the region to be soled the surface of the shoe upper is first roughened and, if desired, applied with an adhesive. Only a small portion of defective sole attachments are the result of sole adhesives used such as polychloroprene or polyurethane adhesives. Instead, such defective sole attachments are known to result from careless or inadequate Processing to assure adherence of the molded sole on to the shoe upper.

Tools used for roughening comprise wire brushes, roughening discs and roughening rolls having steel wires embedded in a rubber holder, grinding stones and sanding belts. Machine roughening, as well as manual roughening, requires that the tool be guided with precision to avoid damage to the surface material of the shoe upper. An important factor during the roughening process is also the pressure applied by the tool. Roughening must be carried out in such a manner that the surface of the shoe upper is cleaned of foreign substances such that the outer surface layers are removed exposing a cleaner layer of material with which the sole can permanently adhere, if necessary using an intermediate layer of adhesive.

Also, roughening brushes can be guided about the shoe periphery by following a pattern tat matches the last which is being used so as to automate the roughening process. The drawback is that this requires a separate pattern for each last thus resulting in an increase in time and material cost. Also, guiding the roughening tool in such manner does not take into consideration any unevenness or profile imperfections of the shoe upper material or of the last.

During application of the adhesive it is important that the adhesive layer on the surface of the shoe upper be precisely positioned and that its thickness ranging from 20 to 30 microns be as uniform as possible. If the adhesive layer is thicker the layer can crack which may result in the adhesive layer peeling off. Moreover, a too thin layer of adhesive reduces the adhering effect required for the molded on sole. Thus, automation of the adhesive layer application is limited without introducing more extensive and costly adhesive applying operations. This limitation applies to the roughening procedure as well.

Also, the sole extruding or molding of polyurethane presents problems due to its low viscosity. To assure that the molded sole is appropriately sealed to the shoe upper, the Polyurethane is injected into the mold cavity which is larger than that of the sole to be extruded, whereby the polyurethane is foamed. It is then compacted to form the sole. Formations of injection molds which largely prevent expulsion of material are disclosed in West German patent Nos. 20 22 118 and 20 48 596. Since the formation of burrs at the edge of the sole cannot be completely prevented, the burrs must be removed after the sole material cures. This also applies to shoes having multi-layered soles disclosed in the West German patent No. 22 41 493. During the first work cycle of the process therein disclosed the outer sole is extruded into the mold cavity, formed by side mold elements, a bottom stamp and a counter stamp, such that the mold cavity size is not reduced until the polyurethane has been foamed to the size of the inner sole. The counter stamp is replaced by the last supported shoe upper and the inner sole is extruded in a corresponding manner or compression molded by reducing the size of the mold cavity.

SUMMARY OF THE INVENTION

It is an object of the present invention to provide a Process and system by which the roughening of the surface of the shoe upper in the region to be soled, the application of adhesive and/or the final deburring can be carried out automatically while avoiding the aforementioned drawbacks in an economical and less time consuming yet highly effective manner. In particular specific variations in the last, the mold and/or the material of the shoe upper, as well as the imperfections at the sealing edges are compensated for in accordance with the present process and system.

In accordance with the invention the production inaccuracies of the mold, the lasts and the positioning errors thereof and the position changes during the molding operation especially while employing a circular turntable installation, are taken into account simultaneously and are compensated for so that the processing tools that are used are effective without damage to the material of the upper or to the molded on sole. The quality of the shoe produced is improved by higher accuracy in the production.

The present invention may operate with a circular turntable installation which supports a plurality of equally spaced apart shoe molding apparatus at shoe molding stations, with each apparatus having a last supported shoe upper, a movable bottom stamp and a mold cavity delimited by the bottom stamp and a pair of opposing lateral side mold elements closed against the periphery of the shoe upper. The peripheral curvature of a shoe upper, having a predetermined shape, is measured at one of the stations by determining a curved line of spatial coordinates and angles of curvature starting at a first preselected null point at the shoe upper in the region of the lateral side mold elements. The turntable is incrementally rotated for positioning another shoe, having the same predetermined shape, at such one station. Selected points at the periphery of this another shoe upper are then scanned, in the region of the side mold elements, for comparing the selecting points to the spatial coordinates and angles of curvature, and any deviation therefrom is adapted to a second preselected null point. The shoe upper is processed by guiding a tool, such as a roughening element, an adhesive applicator and/or a deburring element, along the curved line. Low viscosity material is injected into the mold cavity for molding a sole onto the shoe upper.

The splinters or particles that are removed by roughening or deburring are immediately suctioned off such that the splinters or particles avoid contaminating the shoe uppers being subsequently processed and thus assure the application of uncontaminated adhesives.

By multiplying the spatial coordinates and angles of curvature obtained by fixed preselected variables, peripheral shoe upper measurements of a shoe upper having the same shape but a different size can be easily determined. Thus, the peripheral curvature of the shoe upper need be measured only once to facilitate production of a complete series of shoes having varying sizes.

Using a rotary turntable installation the last supported shoe uppers are incrementally moved in succession relative to a fixed, computer controlled robotic processing tool having a tool carrying arm guided along the established curve around the shoe upper in the region to be molded on. If roughening, application of adhesive and deburring are to be carried out, three such robotic tools can be located in corresponding positions. However, only a single robotic device need be provided with the various processing tools exchanged to carry out the various processing operations. Thus, according to the invention, the roughening, adhesive applying and deburring operations are based on the same three spatial coordinates and angles of curvature defining the established curved line. And, for different shoe sizes, the tools can be guided along corresponding parallel paths.

The measuring device according to the present system functions to measure the last supported upper or the related molds during series production of the shoes. Once such a measurement is taken, it can be identified and corroborated by scanning only a few points along the shoe periphery relative to its type and size and also relative to its change in position at which it occupies on the rotary turntable. The measuring device may include measuring feelers of the contact or non-contact type which establish values that are stored in a measurement data register. This register includes the spatial coordinates and the related angles of curvature of the upper or sole geometry to be scanned and set based on the coordinate null point. With these values fed to the computer controlled robotic tool, the tool can be appropriately guided along the established curve, and articulated to an arm of the robot, in such a manner that it is moved tangentially along the curvature of the shoe upper over the region to be soled. The tool is interchangeable so that the same robotic device can perform the roughening, adhesive applying and deburring operations. Suitable tools to be used for this purpose are a milling cutter, an adhesive gun applicator and/or a heatable blade.

BRIEF DESCRIPTION OF THE DRAWINGS

FIG. 1 is a schematic top plan view of a circular turntable installation showing a plurality of stations at each of which a shoe molding apparatus is located, together with an injection device for the outer sole material and a mixing/injection device for the inner sole material shown relative to the turntable, as well as the fixed measuring device and the fixed robotic devices of the invention;

FIG. 2 is a schematic side elevational view of a last supported shoe upper relative to the computer controlled robotic processing tool of the invention; and FIG. 3 is a side view at a reduced scale and partly in section of the last supported shoe upper relative to a closed shoe mold.

DETAILED DESCRIPTION OF THE INVENTION

Circular turntable 1 of FIG. 1 is the same as that disclosed in U.S. Pat. No. 4,801,256, commonly owned herewith, providing a plurality of equally spaced apart molding stations 2. The entirety of the disclosure of this patent is therefore specifically incorporated herein by reference. A molding apparatus of the type disclosed in U.S. Pat. No. 4,801,256 may be located at each molding station 2, or some other type molding apparatus is positioned at each molding station having at least a shoe last 10 supporting a shoe upper 11 (FIG. 2), a bottom stamp or counter mold 16 and a pair of opposing side mold elements 17 and 18 (FIG. 3).

In the FIG. 1 arrangement, each mold station will reach its original position after 15 incremental turns of the turntable. The positions are designated $2_{01}$ to $2_{14}$. A radially disposed plastification and injection aggregate device 3 for an elastomer is located adjacent the periphery of the turntable. After each incremental movement of the turntable device 3 is locked in some normal manner relative to one of the molding stations such as $2_{01}$, and is capable of shifting radially relative to the turntable. When the device 3 is interlocked with the mold station, elastomer for the outer soles is injected into the mold cavity of the apparatus.

A device 4 for the mixing of the mixture reacting into Polyurethane is also arranged in a radially shiftable manner relative to the turntable. After each incremental turn of the turntable this device can also be interlocked with one of the workstations such as $2_{03}$, so that the material for molding the inner sole is injected into the mold cavity 20 (FIG. 3) of the apparatus.

As more fully described in U.S. Pat. No. 4,801,256, an outer sole and an inner sole are respectively injected at the same time and, simultaneously, in the area between stations $2_{04}$ or $2_{14}$ a finished shoe having a molded outer sole of elastomer and a molded inner sole of polyurethane is removed at a discharge station. A pair of opposing shoe lasts are provided on a pivotable last turning body, similar to that shown in West German patent No. 22 41 493, so that after the finished shoe is removed the other last supported shoe upper is presented to the mold cavity for continuing the series production.

At one of the stations, such as $2_{01}$, the peripheral curvature of shoe upper 11 having a predetermined shape is measured by a measuring feeler or probe 19, of the contact or non-contact type connected via line 21 to a shape measuring device 22 of known construction and operation. The device determines a curved line of spatial coordinates and angles of curvature starting at a first preselected null point at the shoe upper in the region of lateral side mold elements 17 and 18 (FIG. 3). The values obtained are stored in register 23. Turntable 1 is incrementally rotated for positioning another last supported shoe upper, having the same predetermined shape, from station $2_{14}$ to station $2_{01}$. Selected points at the periphery of this other shoe upper are then scanned at station $2_{01}$, in the region of the side mold elements, for comparing these selected points to the spatial coordinates and angles of curvature which had been stored at values register 23. Because of imperfections or inaccuracies of the shoe last or of the shoe upper or of the mold elements, or because of the change in position of the upper from station $2_{14}$ to station $2_{01}$, there may be deviations from the measured values during the scanning. These deviations are adapted to a second preselected null point to compensate for these deviations such that the established curved line will now start at this new preselected null point.

Register 23 is operatively connected to a computer 24 which controls a robotic device 13 having an articulated arm 14. The arm supports a processing tool 15 which may comprise a roughening element, an adhesive applicator or a deburring element. The robotic device is programmed in some normal manner such that the processing tool on the articulated arm will follow the curved line of spatial coordinates and angles of curvature as determined during the measuring and scanning operations as aforedescribed.

A suction hose 12 of a suctioning device (not otherwise shown) is coupled to arm 14 such that as splinters or particles are removed during the roughening and deburring operations they are immediately suctioned off by the hose.

Robotic device 13 may be located at station $2_{02}$ for the roughening and adhesive applying operations. And, another robotic device 13a may be located at another mold station, such as $2_{08}$, for the deburring operation.

Register 23 may be provided with graduated multipliers for multiplying the spatial coordinates and angles of curvature obtained by the measuring step by fixed preselected variables for determining peripheral shoe upper measurements of a shoe upper having the same predetermined shape as aforedescribed but of a different size. Thus, once the curved line is obtained by measurement, only the selected points need be scanned for comparing them to the once measured coordinates in adapting them to determine a new null point if necessary.

What is claimed is:

1. A process for molding soles onto last supported shoe uppers, comprising the steps of: providing a shoe molding apparatus at each of a plurality of equally spaced apart shoe molding stations on a circular turntable installation, each said apparatus comprising a last supported shoe upper, a movable bottom stamp, and a mold cavity delimited by the bottom stamp and a pair of opposing lateral side mold elements closed against the periphery of the shoe upper; measuring, at one of said stations, the peripheral curvature of a first shoe upper having a predetermined shape by determining and storing a curved line of spatial coordinates and angles of curvature starting at a first preselected null point at the first shoe upper in the region of the lateral side mold elements; incrementally rotating the turntable for positioning another last supported shoe upper, having a different shape, at said one station; scanning, at said one station, selected points at the periphery of the other shoe upper, in the region of the side mold elements, for comparing the selected points to the stored spatial coordinates and angles of curvature and adapting any deviation therefrom to a second preselected null point; processing the shoe upper by guiding a tool along the curved line starting at the second null point, and injection molding low viscosity material into the mold cavity for molding a sole on to the shoe upper.

2. The process according to claim 1, wherein the processing includes roughening the shoe upper periphery prior to the injection molding.

3. The process according to claim 1, wherein the processing includes applying adhesive along the shoe upper periphery prior to the injection molding.

4. The process according to claim 1, wherein the processing includes deburring the molded sole along the shoe upper periphery after the injection molding.

5. The process according to claim 2, wherein the processing further includes suctioning off removed roughened particles.

6. The process according to claim 4, wherein the processing further includes suctioning off removed deburred particles.

7. The process according to claim 1, further comprising the step of multiplying by fixed preselected variables the special coordinates and angles of curvature obtaining by the measuring step for determining peripheral shoe upper measurements of a shoe upper having said predetermined shape but of a different size.

8. The process according to claim 1, wherein the processing includes a computer-controlled robot supporting the tool.

9. A system for molding soles on to last supported shoe uppers, comprising a circular turntable installation supporting a shoe molding apparatus at each of a plurality of equally spaced apart shoe molding stations, each said apparatus comprising a last supported shoe upper, a movable bottom stamp, and a mold cavity delimited by the bottom stamp and a pair of opposing lateral side mold elements closed against the periphery of the shoe upper, means at one of said stations for measuring the peripheral curvature of a shoe upper having a predetermined shape to determine a curved line of values of spatial coordinates and tangential angles starting at a first preselected null point at the shoe upper in the region of the lateral side mold elements, means for registering said values means for scanning selected points on another last supported shoe upper and comparing these points to the registered values, a computer-controlled robotic processing tool connected to said registering means for receiving said values for being guided along the curved line, and means for injecting low viscosity material into the mold cavity for molding a sole onto the shoe upper.

10. The system according to claim 9, wherein said tool comprises an element for roughening the shoe upper periphery preparatory to injection molding.

11. The system according to claim 9, wherein said tool comprises a device for applying adhesive along the shoe upper periphery preparatory to injection molding.

12. The system according to claim 9, wherein said tool comprises an element for deburring the molded sole along the shoe upper after the sole is molded onto the shoe upper.

13. The system according to claim 10, wherein said tool further comprises means for suctioning off removed roughened particles.

14. The system according to claim 12, wherein said tool further comprises means for suctioning off removed deburred particles.

* * * * *